UNITED STATES PATENT OFFICE.

JOSHUA KIDD, OF NEW YORK, N. Y.

IMPROVEMENT IN APPARATUS FOR EXHAUSTING GAS FROM RETORTS.

Specification forming part of Letters Patent No. 122,894, dated January 23, 1872; reissue No. 4,929, dated June 4, 1872.

*To all whom it may concern:*

Be it known that I, JOSHUA KIDD, of the city, county, and State of New York, have invented a new and useful Improvement in Apparatus for Exhausting Gas from Retorts; and I do hereby declare that the following is a full, clear, and exact description thereof, which will enable others skilled in the art to make and use the same.

My invention consists in a method of utilizing the elastic force of naphtha vapor and making its escaping force act as a motive power to operate an exhausting apparatus; also, in a novel method of mixing air with rich gas by placing in the pipe conveying the gas from the decomposing retorts to the exhausting apparatus a cock or other adjustable aperture, which may be so adjusted that any required amount of air can be drawn in and mixed with the gas. My invention is only intended to be used where a gas of very high candle power is produced, such as naphtha or oil-gas, as it is well known that air mixed with gas poor in carbon will very much lessen its illuminating power.

The method adopted for mixing gas with air before my invention was to pass the gas and draw the air intended to be mixed with it through the well-known wet-meter drum-mixer. This arrangement is very cumbrous and expensive, and does not allow the amount of air to be varied.

Naphtha vaporizes at a temperature varying from 100° to 195° Fahrenheit, and when generated under pressure, is very elastic, and may be used as a motive power for driving any exhausting apparatus or engine for operating the same. If a large and small wet gas-meter drum properly incased be joined together and both made fast to one shaft, naphtha vapor under pressure forced through the small drum will actuate the larger drum on same shaft, which larger drum, if connected to the outlets of the retorts, will draw the gas from them. If an adjustable opening be placed between the decomposing-retorts and the large exhausting-drum, air will be drawn into the drum with the gas. If desired, naphtha vapor generated under pressure may be made like steam to operate any motive-power engine for working any exhausting apparatus, and the vapor, after having expended its elastic force as a motive power in operating the exhausting apparatus, may be conducted to the decomposing-retorts, and there converted into a fixed gas.

What I wish to claim as my invention is—

An adjustable aperture or cock placed in any part of the exit-pipe between the decomposing-retorts and the exhausting apparatus, or any equivalent of the same, for allowing atmospheric air to be drawn into the exhauster with the gas.

JOSHUA KIDD.

Witnesses:
FRANCIS SIMMONS.
JAMES KIDD.